(12) United States Patent
Li et al.

(10) Patent No.: US 6,514,636 B2
(45) Date of Patent: Feb. 4, 2003

(54) ULTRA-SMOOTH DIELECTRIC MEMBERS FOR LIQUID ELECTROLYTE FUEL CELLS

(75) Inventors: Jian Li, New Milford, CT (US); Hansraj C. Maru, Brookfield, CT (US)

(73) Assignee: FuelCell Energy, Inc., Danbury, CT (US)

( * ) Notice: Subject to any disclaimer, the term of this patent is extended or adjusted under 35 U.S.C. 154(b) by 0 days.

(21) Appl. No.: 09/736,549

(22) Filed: Dec. 13, 2000

(65) Prior Publication Data

US 2002/0071982 A1 Jun. 13, 2002

(51) Int. Cl.[7] ................................................. H01M 8/04
(52) U.S. Cl. ............................................ 429/35; 429/34
(58) Field of Search ............................... 429/35, 34, 36, 429/37

(56) References Cited

U.S. PATENT DOCUMENTS

| 4,414,294 | A | | 11/1983 | Guthrie |
| 4,548,874 | A | * | 10/1985 | Katz et al. ................ 429/35 X |
| 5,070,658 | A | * | 12/1991 | Rajner et al. |
| 5,110,692 | A | | 5/1992 | Farooque et al. |
| 5,939,219 | A | * | 8/1999 | Jansing et al. ............ 429/35 X |
| 6,165,632 | A | * | 12/2000 | Blum et al. ............... 429/35 X |
| 6,329,065 | B1 | * | 12/2001 | Ishida et al. |
| 6,348,279 | B1 | * | 2/2002 | Saito et al. ................... 429/34 |

* cited by examiner

Primary Examiner—John S. Maples
(74) Attorney, Agent, or Firm—Robin, Blecker & Daley

(57) ABSTRACT

A dielectric member having a reduced electrolyte creepage characteristic is realized by forming the dielectric member to have a surface roughness of Ra 10 or less.

9 Claims, 7 Drawing Sheets

ULTRA-SMOOTH DIELECTRIC MEMBERS FOR LIQUID ELECTROLYTE FUEL CELLS

BACKGROUND OF THE INVENTION

This invention relates to dielectric members and, in particular, to dielectric members used for electrical isolation in liquid electrolyte fuel cells.

In a carbonate (liquid electrolyte) fuel cell stack which uses external manifolds for gas supply and discharge, the manifolds are separated from the fuel cell stack by a ceramic dielectric member in the form of a picture frame. This is described in U.S. Pat. No. 4,414,294, in which a ceramic dielectric frame is provided for electrical insulation and reactant gas sealing.

The voltage across the carbonate fuel stack is normally between 100 to as high as 1000 volts depending on the number of cells in a stack and the electrical configuration of the stacks when arranged in a power plant. The ceramic dielectric frame itself is capable of providing electrical isolation to thousands of volts. However, during fuel cell operation, the liquid electrolyte in the fuel cell stack tends to creep over the surface of the dielectric frame. For molten carbonate fuel cells, the electrolyte is alkali carbonates. At the operating temperature, the carbonates are liquid. Once the electrolyte contacts the frame, a thin continuous layer of conductive liquid electrolyte film forms on the frame surfaces. Consequently, the dielectric characteristic of the frame is reduced.

This compromises the integrity of the fuel cell stack. As a result, techniques are being sought for preventing or reducing the electrolyte creepage. One proposed technique is to situate a layer of porous gasket between the dielectric frame and the stack. This gasket enhances the gas sealing and helps retard electrolyte flow from the stack. A gasket of this type is described in U.S. Pat. No. 5,100,692.

The gasket of the '692 patent offers one way of retarding electrolyte creepage along the surface of a ceramic dielectric frame. Other techniques for reducing electrolyte creepage are still being sought.

It is, therefore, an object of the present invention to provide a dielectric member which exhibits reduced surface creepage of fuel cell electrolyte when used in a fuel cell stack.

It is a further object of the present invention to provide a dielectric member in which such reduced creepage of fuel cell electrolyte is realized simply and at low cost.

SUMMARY OF THE INVENTION

In accordance with the principles of the present invention, the above and other objectives are realized in a dielectric member for electrically insulating a manifold or other component from a fuel cell stack by forming the member to have a surface roughness of Ra (Ra: the average deviation of the profile from the mean line, in $\mu$ inches) of 10 or less. A surface having this degree of roughness can be realized by lapping or polishing the dielectric member or by using a fine grained powder to form the member. A preferable dielectric material for forming the member is $Al_2O_3$ with a density higher than 95% of the theoretical density. A more preferable density for the $Al_2O_3$ is a density higher than 98% of the theoretical density.

BRIEF DESCRIPTION OF THE DRAWINGS

Other features and aspects of the present invention will become more apparent upon reading the following detailed description in conjunction with the accompanying drawings, in which.

DETAILED DESCRIPTION OF THE INVENTION

Figure 1:
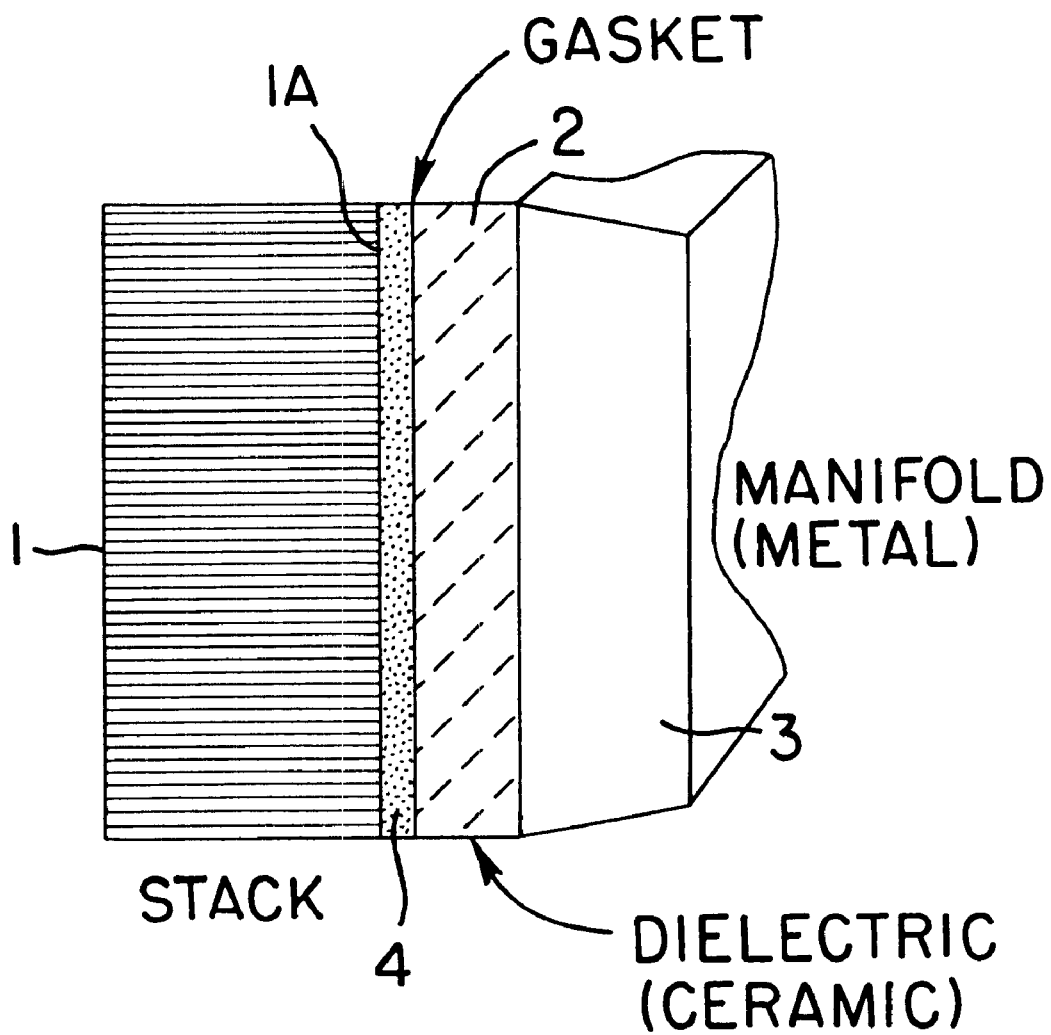
FIG. 1 shows a portion of a fuel cell stack utilizing a dielectric member in accordance with the principles of the present invention.

FIG. 1 shows a fuel cell stack 1 utilizing a dielectric insulator member 2 in accordance with the principles of the present invention. The member 2 electrically insulates the stack 1 from a manifold 3 which abuts the face 1A of the stack 1. The stack 1 contains a liquid electrolyte, which, for illustrative purposes, is assumed to be a carbonate electrolyte.

Figure 7:
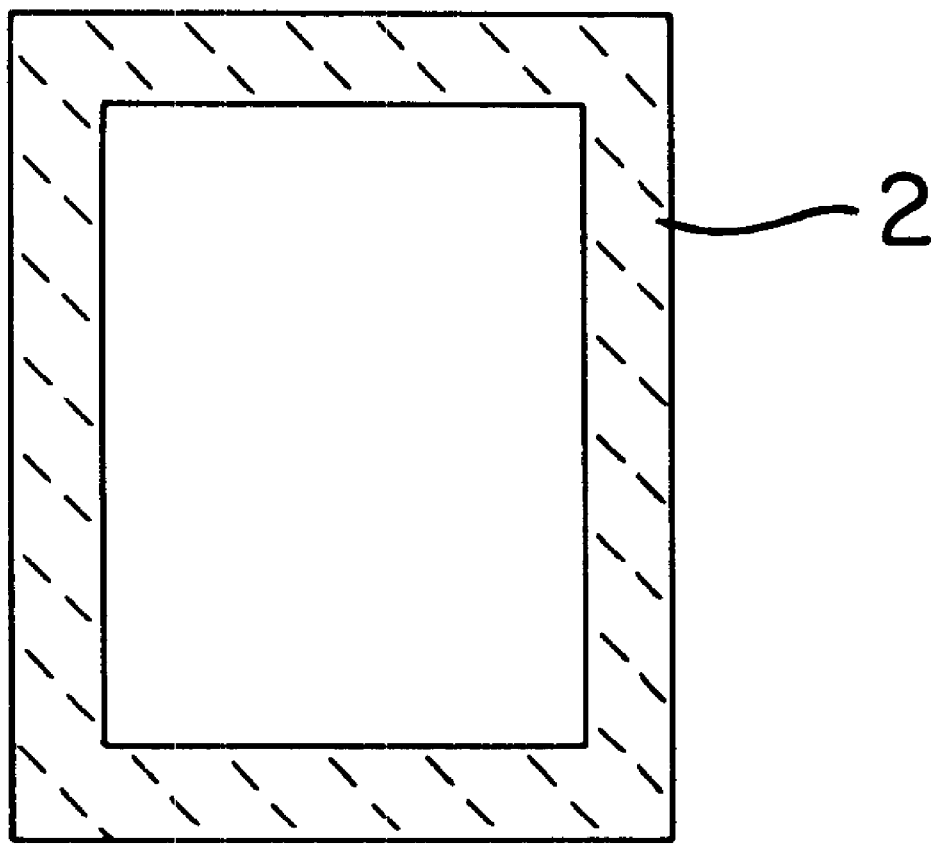
FIG. 7 shows the dielectric member of FIG. 1 in the form of a picture frame.

In the case shown, a gasket 4 contacts the face 1A of the stack. The member 2, which typically might have a picture frame configuration as shown in FIG. 7, abuts the gasket 4, while the manifold 3 the member 2.

It is known that over time, the carbonate electrolyte of the stack 1 will creep over the surface of the member 2. It is also known that the degree or amount of this creepage depends on a variety of interfacial energies (vapor-liquid, vapor-solid and liquid-solid).

Figure 2:
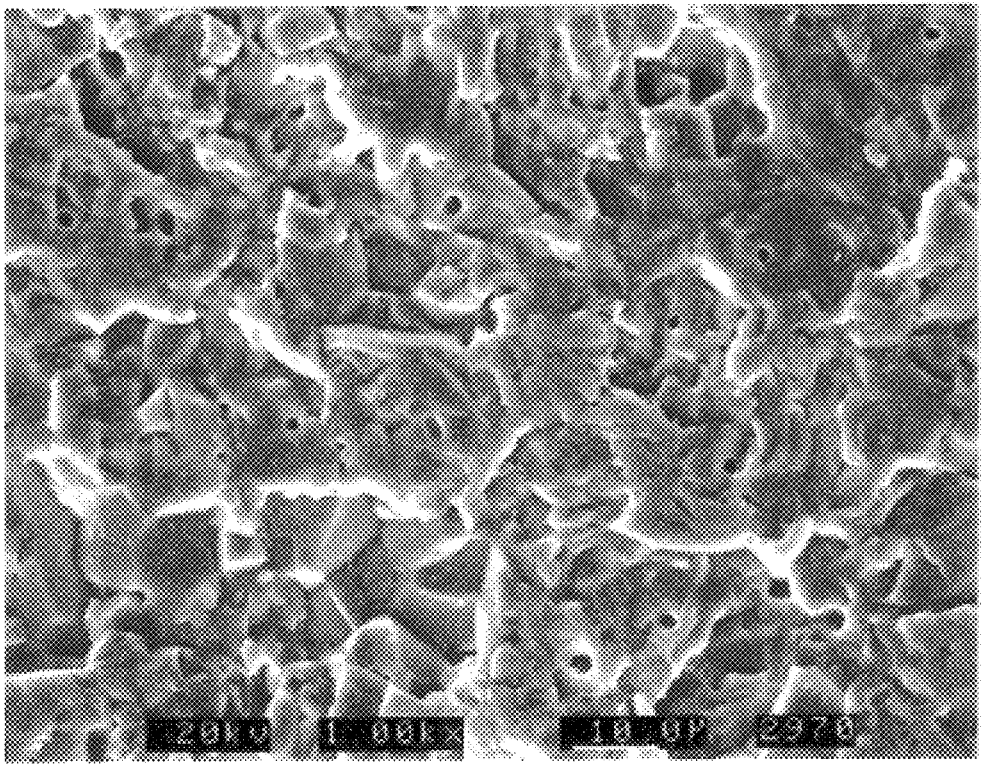
FIG. 2 shows the surface morphology of a prior art dielectric member.

In accordance with the principles of the present invention, it has been recognized that the amount of the electrolyte creepage is also dependent on and can be controlled by the roughness of the surface of the member 2. This roughness controls the capillary effect, which in turn, controls the electrolyte flow. In known dielectric members, the surface roughness is typically Ra 29 (Ra: the average deviation of the profile from the mean line, in $\mu$in) or higher. This results from using conventional machining and grinding processes in the manufacture of these members. As shown in FIG. 2, with an Ra at this level, these members exhibit a relatively rough surface as a result of continuous grain pullouts. It has now been recognized that this rough surface acts as a capillary medium, enhancing the electrolyte creepage rate and transporting a high capillary flow volume of the electrolyte over the member.

Figure 3:
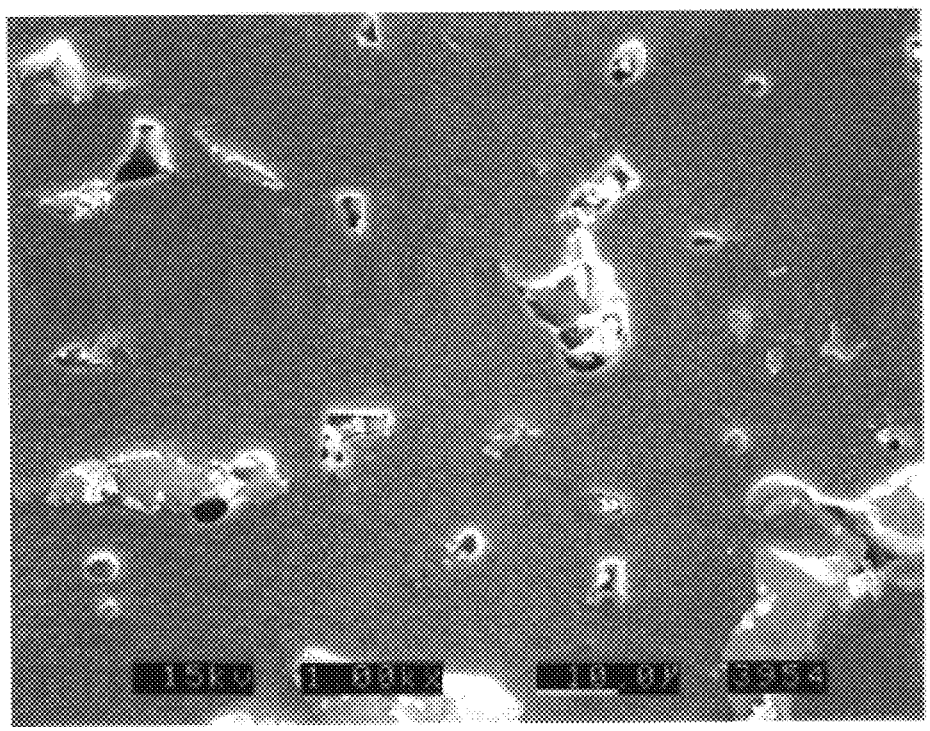
FIG. 3 shows the surface morphology of the dielectric member of the invention.

In accordance with the principles of the present invention, the member 2 is formed to have a substantially increased smoothness of its surface, i.e., to have an Ra of 10 or less, which significantly reduces the capillary movement of the electrolyte. FIG. 3 is a micrograph of the member 2 formed in accord with the invention to have a surface roughness of Ra 7. As can be seen, the surface of the member 2 has fewer pullouts and these are isolated by very smooth surface areas on which the capillary action cannot take place. As a result, the overall creepage of electrolyte over the surface of the member 2 is significantly reduced.

A preferable material for the member 2 is a sintered $Al_2O_3$ with a density higher than 95% of the theoretical density. A more preferable material is an $Al_2O_3$ material with a density higher than 98% of the theoretical density. The member 2 can be formed to have a surface with an Ra of 10 or less in a variety of ways. Preferable techniques include lapping or polishing of the surface or forming the member by using fine-grained (submicron) starting $Al_2O_3$ powder material.

The following examples illustrate the principles of the invention.

Example 1

Figure 4:
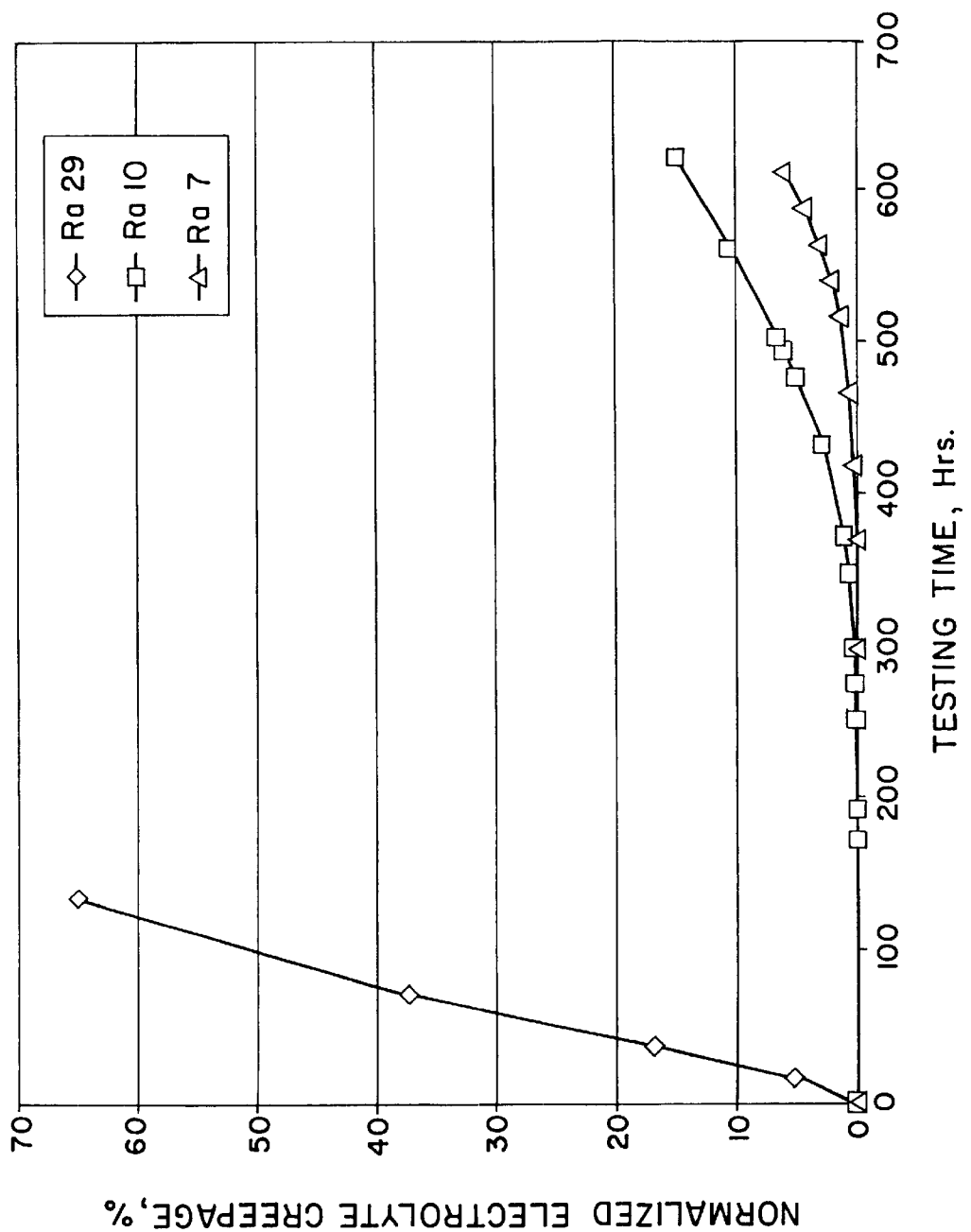
FIG. 4 shows a comparison of the electrolyte creepage for the dielectric member of the invention and for a prior art dielectric member.
Figure 5:
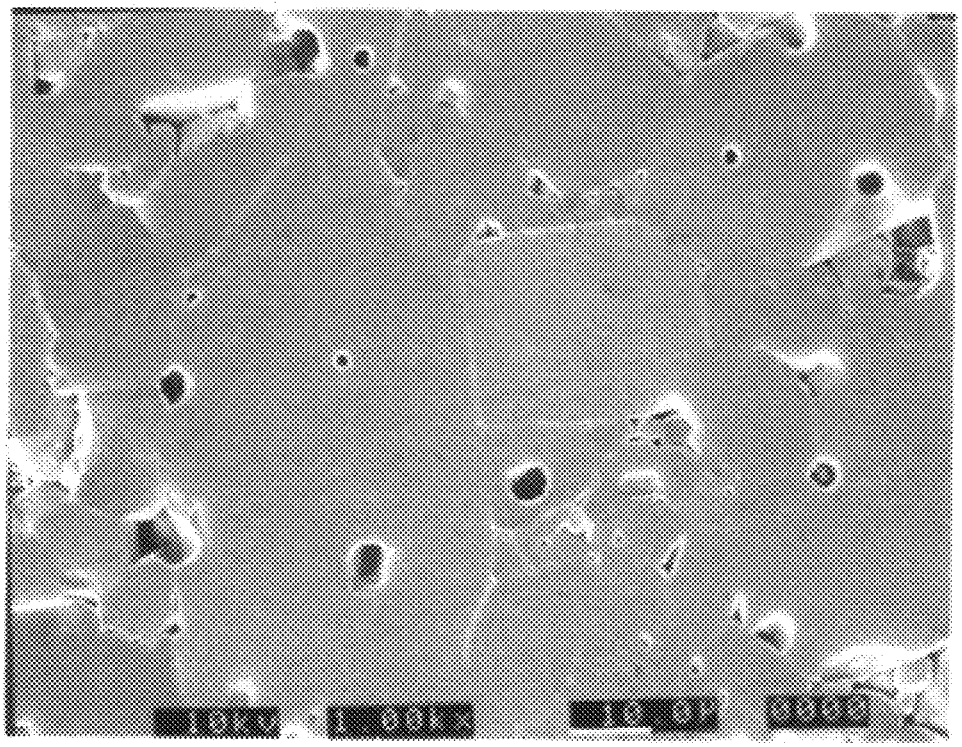
FIG. 5 shows the surface morphology for a dielectic member of the invention.

An accelerated electrolyte-pool test was conducted using three rectangular bar specimens comprised of $Al_2O_3$ having a density higher than 98% of the theoretical density. Each specimen had dimensions of 4"×1"×0.625" and the surfaces of the three specimens were polished so that the specimens had respective Ra's of 7, 10 and 29. The bottom surface of each specimen was submerged in a liquid electrolyte pool (infinite electrolyte supply), and a piece of gasket, serving as an electrolyte absorbent, was laid on the top surface to collect the creeping electrolyte. FIG. 4 shows the testing results As can be seen, the $Al_2O_3$ ceramic bar having the smooth surface (Ra of 7 and 10) significantly slowed down the liquid electrolyte creepage, as compared with the $Al_2O_3$ specimens with Ra 29. FIG. 5 shows the surface morphology of the Ra 7 bar after being tested in the accelerated-pool test. The surface morphology remains unchanged. A reaction between the specimen and the electrolyte occurred, but it did not significantly change the surface roughness; and, therefore, did not change the electrolyte creepage on the surface.

Example 2

Figure 6:
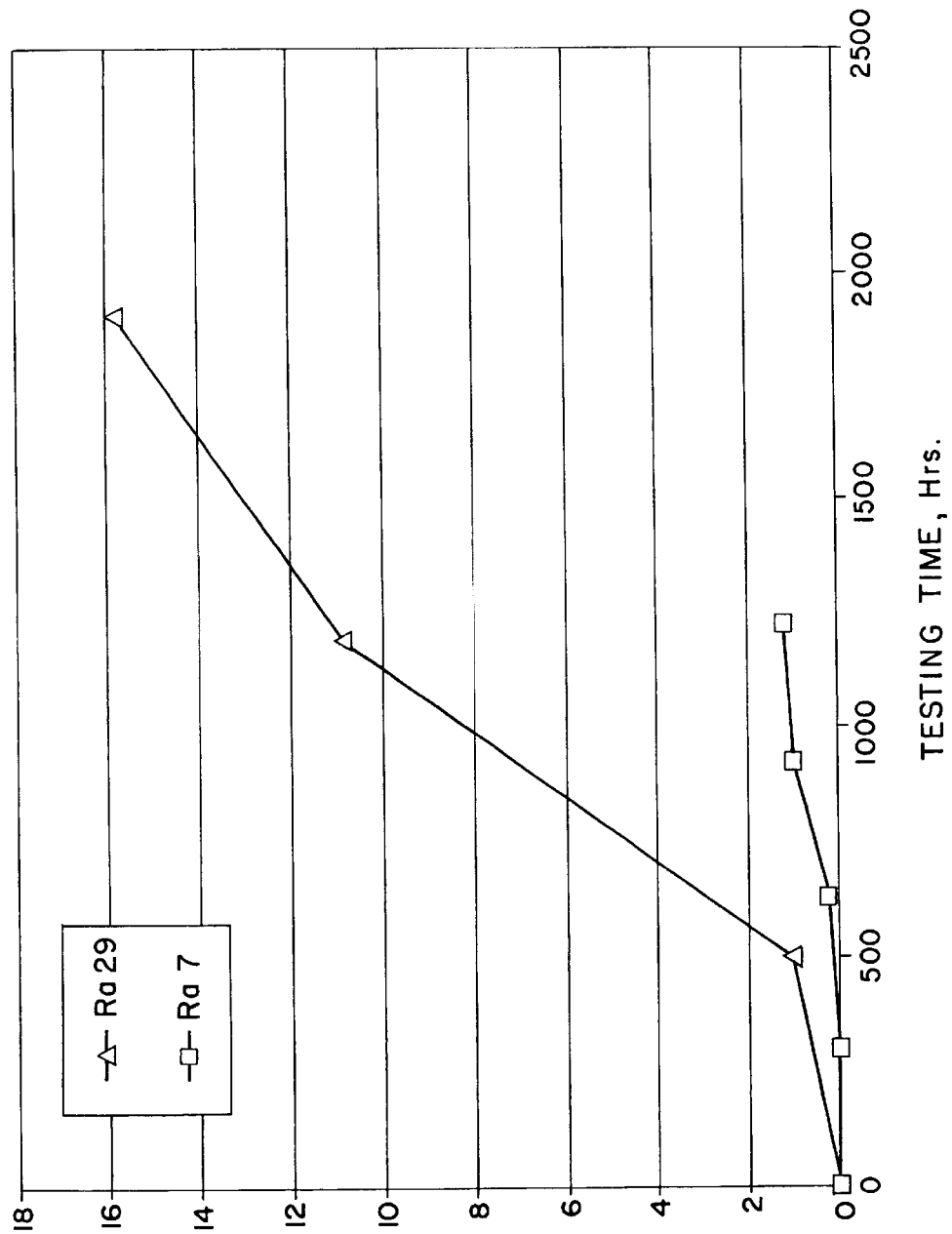
FIG. 6 shows a comparison of the electrolyte creepage for a dielectric member of the invention and for a prior art dielectric member.

A controlled electrolyte supply test was conducted, in which the liquid electrolyte source was provided by a gasket with 60% void volume filled with the electrolyte. Two rectangular bar specimens made of $Al_2O_3$ having a density greater than 98% of the theoretical density and dimensions 4"×1"×0.625" were placed in a sitting position on the electrolyte filled gasket. The specimens had surfaces finished to provide respective Ra's of 7 and 29. The creeping electrolyte was picked up by a piece of gasket as in Example 1. FIG. 6 shows the electrolyte creep for the two specimens. As can be seen, the specimen with the Ra 7 had significantly less creep than the specimen with Ra 29. The surface reaction between the electrolyte and the bar specimen was insignificant as described above.

Example 3

An alternate ceramic material, Mullite ($3Al_2O_3·2SiO_2$) with Ra 10 surface finishing., was evaluated in the accelerated electrolyte-pool test. This material vigorously reacted with the electrolyte, enhancing electrolyte transport crossing the surface.

An electrolyte creepage modeling analysis has also been carried out and it supports the above experimental results. An $Al_2O_3$ dielectric with Ra 10 surface finishing is believed sufficient to provide the electrical insulation between the metallic manifold 3 and the stack 1 for 40,000 hours (stack life design). The surface smoothness of Ra 10 or less can be made by lapping or polishing, or low-cost grinding if fine $Al_2O_3$ powders (submicron) are used as the raw material for forming the member 2.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention. Thus, for example, other dielectric materials can be used to form the member 2 as long as these materials are substantially inert in the electrolyte environment.

What is claimed is:

1. A fuel cell system comprising:

a fuel cell stack including liquid electrolyte fuel cells;

a manifold abutting a face of the fuel cell stack;

a dielectric member situated between the manifold and the face of the fuel cell stack for electrically isolating the manifold from the fuel cell stack, the dielectric member having a surface roughness of Ra 10 or less.

2. A fuel cell system in accordance with claim 1, wherein:

said fuel cells are carbonate fuel cells; and said manifold is metallic.

3. A fuel cell system in accordance with claim 1; wherein:

said dielectric member comprises $Al_2O_3$.

4. A fuel cell system in accordance with claim 3; wherein:

said dielectric member is formed from sub-micron $Al_2O_3$ powder material.

5. A fuel cell system in accordance with claim 3, wherein:

said $Al_2O_3$ has a density which is higher than 95% of the theoretical density.

6. A fuel cell system in accordance with claim 5, wherein:

said $Al_2O_3$ has a density which is higher than 98% of the theoretical density.

7. A fuel cell system in accordance with claim 1, wherein:

said surface roughness of said dielectric member is provided by one of lapping and polishing said member.

8. A fuel cell system in accordance with claim 1, wherein:

said dielectric member is in the form of a frame.

9. A fuel cell system in accordance with claim 8, wherein:

said dielectric member is in the form of a picture frame.

* * * * *

UNITED STATES PATENT AND TRADEMARK OFFICE
CERTIFICATE OF CORRECTION

PATENT NO.      : 6,514,636 B2                                                      Page 1 of 1
DATED           : February 4, 2003
INVENTOR(S)     : Jian Li et al.

It is certified that error appears in the above-identified patent and that said Letters Patent is hereby corrected as shown below:

Column 2,
Line 32, delete "manifold 3 the member 2." and insert -- manifold 3 abuts the frame 2. --.

Signed and Sealed this

Sixteenth Day of December, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,514,636 B2
DATED          : February 4, 2003
INVENTOR(S)    : Jian Li et al.

It is certified that error appears in the above-identified patent and that said Letters Patent is hereby corrected as shown below:

<u>Column 1,</u>
Line 3, insert -- STATEMENT AS TO RIGHTS TO INVENTIONS MADE UNDER FEDERALLY SPONSORED RESEARCH AND DEVELOPMENT
This invention was made with Government support under contract DE-FC21-95MC31184 awarded by the Department of Energy. The Government has certain rights in the invention. --.

Signed and Sealed this

Second Day of May, 2006

JON W. DUDAS
*Director of the United States Patent and Trademark Office*